(12) United States Patent
Hu et al.

(10) Patent No.: US 10,367,595 B1
(45) Date of Patent: Jul. 30, 2019

(54) APPARATUS AND RECEIVER FOR RECEIVING RF ANALOG SIGNALS

(71) Applicants: Lan Hu, Ottawa (CA); Xinyu Xu, Ottawa (CA); Tan Huy Ho, Stittsville (CA); Andrei Buliga, Ottawa (CA); David Neal Wessel, Ottawa (CA)

(72) Inventors: Lan Hu, Ottawa (CA); Xinyu Xu, Ottawa (CA); Tan Huy Ho, Stittsville (CA); Andrei Buliga, Ottawa (CA); David Neal Wessel, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/956,499

(22) Filed: Apr. 18, 2018

(51) Int. Cl.
| | |
|---|---|
| *H04J 13/00* | (2011.01) |
| *H04L 27/26* | (2006.01) |
| *H04L 1/00* | (2006.01) |
| *H04B 1/68* | (2006.01) |
| *H04B 1/707* | (2011.01) |

(52) U.S. Cl.
CPC ........ *H04J 13/0022* (2013.01); *H04L 1/0003* (2013.01); *H04L 1/0071* (2013.01); *H04L 27/2649* (2013.01); *H04B 1/68* (2013.01); *H04B 1/707* (2013.01)

(58) Field of Classification Search
CPC ........ H04B 1/707; H04B 1/68; H04B 1/7105; H04B 7/0615; G01S 19/24; G01S 19/36; H03C 3/40
USPC .......................................................... 375/130
See application file for complete search history.

(56) References Cited

U.S. PATENT DOCUMENTS

| | | | |
|---|---|---|---|
| 6,275,483 B1* | 8/2001 | Papasakellariou | H04B 1/70753 370/335 |
| 6,414,988 B1* | 7/2002 | Ling | H04B 1/7115 370/209 |
| 6,608,818 B1* | 8/2003 | Abrol | H04L 1/1809 370/252 |
| 6,667,961 B1* | 12/2003 | Park | H04J 13/0077 370/208 |
| 6,807,222 B1* | 10/2004 | Widdowson | H04B 1/707 375/147 |
| 2002/0010893 A1* | 1/2002 | Kim | H04B 1/707 714/790 |
| 2002/0110103 A1* | 8/2002 | Jung | H04B 1/708 370/335 |
| 2002/0196754 A1* | 12/2002 | Lugil | H04B 1/707 370/335 |
| 2010/0135367 A1* | 6/2010 | Schmid | G01S 19/24 375/150 |

* cited by examiner

*Primary Examiner* — Leila Malek

(57) ABSTRACT

Apparatus for encoding a plurality of received radio frequency (RF) analog signals. The apparatus includes a plurality of pseudo-noise (PN) encoders for performing analog signal spreading and down-conversion. Each PN encoder is configured to encode a respective received RF analog signal using a respective one of a plurality of mutually orthogonal PN complex codes and to output a respective PN-encoded analog signal. The apparatus also includes a PN complex code source configured to provide the mutually orthogonal PN complex codes to the plurality of PN encoders. The PN complex code source includes a code generator for generating multiple mutually orthogonal PN codes, and a complex modulator for modulating the mutually orthogonal PN codes.

21 Claims, 13 Drawing Sheets

APPARATUS AND RECEIVER FOR RECEIVING RF ANALOG SIGNALS

TECHNICAL FIELD

The present disclosure relates to an apparatus and a receiver suitable for use in a communication device, including a receiver for receiving radio frequency (RF) analog signals in a wireless communication network.

BACKGROUND

A communication device, which may be used for wired and/or wireless communications, may be a base station or other electronic device. Such a communication device may have a transceiver that receives and transmits signals over different frequency bands. The transceiver may be implemented as a receiver and a transmitter. A typical receiver may be designed to process signals in accordance with any suitable protocol and standard, such as time division multiple access (TDMA), frequency division multiple access (FDMA) or code division multiple access (CDMA), among others.

There is increasing demand for more flexible spectrum band access and greater system capacity to support multiple access over a greater number of receiving paths. This poses a higher pressure on hardware resources, requiring better power efficiency and processing speed within a communication device. There are also cost considerations. For example, providing a receiver with a high number of receiving (Rx) paths (e.g., up to 64-256 Rx paths) using conventional receiver architecture may be costly.

Accordingly, it would be useful to provide a solution for processing RF signals over different frequency bands, with lower system hardware costs.

SUMMARY

In some examples, the present disclosure describes an apparatus and a receiver used to receive and process RF analog signals using pseudo-noise (PN) complex codes. The PN complex codes are orthogonal with respect to each other. Each PN complex code may be filtered to remove or reduce negligible undesired harmonics. Each PN complex code is modulated using complex modulation. A PN encoder on each receiving path may use the PN complex code to encode a respective received analog signal, in order to perform analog spreading and down-conversion on the received analog signal in one step. This may help to decrease hardware cost and receiver complexity, for example by enabling sharing of hardware resources among Rx paths and/or avoiding the need for a separate down-conversion stage.

In some aspects, the present disclosure describes an apparatus for encoding a plurality of received RF analog signals. The apparatus includes a plurality of PN encoders for performing analog signal spreading and down-conversion. Each PN encoder is configured to encode a respective received RF analog signal using a respective one of a plurality of mutually orthogonal PN complex codes and to output a respective PN-encoded analog signal. The apparatus also includes a PN complex code source configured to provide the respective mutually orthogonal PN complex codes to the plurality of PN encoders. The PN complex code source includes a code generator for generating multiple mutually orthogonal PN codes, and a complex modulator for modulating the mutually orthogonal codes to generate the mutually orthogonal PN complex codes.

In any of the preceding aspects/embodiments, the PN-encoded analog signals from the plurality of PN encoders may be combinable into a combined analog signal.

In any of the preceding aspects/embodiments, the PN-encoded analog signals may be outputted to be decoded by a decoder.

In any of the preceding aspects/embodiments, each PN encoder may be an in-phase and quadrature-phase (I/Q) PN encoder. The I/Q PN encoder may be configured to encode an in-phase (I) component of the respective received RF analog signal and a quadrature-phase (Q) component of the respective received RF analog signal, to output a PN-encoded I analog signal and a PN-encoded Q analog signal.

In any of the preceding aspects/embodiments, the PN complex code source may include a filter configured to filter out undesired harmonics of the mutually orthogonal PN codes.

In any of the preceding aspects/embodiments, the filter may be a low-pass filter.

In any of the preceding aspects/embodiments, at least one of: a parameter for generating the mutually orthogonal PN codes; or a frequency for modulating the mutually orthogonal PN codes; may be variable.

In any of the preceding aspects/embodiments, the PN complex code source may be configured to receive instructions to set the at least one of: the parameter for generating the mutually orthogonal PN codes; or the frequency for modulating the mutually orthogonal PN codes.

In some aspects, the present disclosure describes a receiver. The receiver includes a plurality of receiving paths. Each receiving path is configured to receive a respective RF analog signal. The receiver also includes a plurality of PN encoders for performing analog signal spreading and down-conversion. Each PN encoder is configured to encode a respective received RF analog signal on a respective receiving path using a respective one of a plurality of mutually orthogonal PN complex codes and to output a respective PN-encoded analog signal. The receiver also includes a PN complex code source configured to provide the respective mutually orthogonal PN complex codes to the plurality of PN encoders. The PN complex code source includes a code generator for generating multiple mutually orthogonal PN codes, and a complex modulator for modulating the mutually orthogonal PN codes. The receiver also includes at least one combiner configured to combine the respective PN-encoded analog signals and output a combined analog signal. The receiver also includes at least one analog to digital converter (ADC) configured to convert the combined analog signal to a combined digital signal. The receiver also includes a decoder configured to decode the combined digital signal and output decoded digital signals corresponding to the respective received RF analog signals.

In any of the preceding aspects/embodiments, each PN encoder may be an in-phase and quadrature-phase (I/Q) PN encoder. The I/Q PN encoder may be configured to encode an in-phase (I) component of the respective received RF analog signal and a quadrature-phase (Q) component of the respective received RF analog signal, to output a PN-encoded I analog signal and a PN-encoded Q analog signal. The at least one combiner may include: an I combiner for combining the PN-encoded I analog signals and output an I combined analog signal; and a Q combiner for combining the PN-encoded Q analog signals and output a Q combined analog signal. There may be at least two ADCs, each ADC being configured to convert a respective one of the I combined analog signal and the Q combined analog signal and to output a respective one of an I combined digital signal and a Q combined digital signal.

In any of the preceding aspects/embodiments, the PN complex code source may include a filter configured to filter out undesired harmonics of the mutually orthogonal PN codes.

In any of the preceding aspects/embodiments, the filter may be a low-pass filter.

In any of the preceding aspects/embodiments, at least one of: a parameter for generating the mutually orthogonal PN codes; or a frequency for modulating the mutually orthogonal PN codes; may be variable.

In any of the preceding aspects/embodiments, the PN complex code source may be configured to receive instructions to set the at least one of: the parameter for generating the mutually orthogonal PN codes; or the frequency for modulating the mutually orthogonal PN codes.

In any of the preceding aspects/embodiments, the plurality of receiving paths used for receiving the RF analog signals may be selected from a total number of available receiving paths at the receiver.

In any of the preceding aspects/embodiments, the receiver may be further configured to receive instructions to select the plurality of receiving paths.

In any of the preceding aspects/embodiments, the receiver may include a controller configured to provide the instructions.

In some aspects, the present disclosure describes a method for encoding a plurality of received RF analog signals. The method includes, at a PN complex code source: generating a plurality of mutually orthogonal PN codes; performing complex modulation on the mutually orthogonal PN codes, to obtain a plurality of mutually orthogonal PN complex codes; and providing the plurality of mutually orthogonal PN complex codes to a plurality of PN encoders. The method also includes, at each PN encoder, performing analog signal spreading and down-conversion by encoding a respective received RF analog signal using a respective one of the plurality of mutually orthogonal PN complex codes, and outputting a respective PN-encoded analog signal.

In any of the preceding aspects/embodiments, each PN encoder may be an in-phase and quadrature-phase (I/Q) PN encoder. Encoding the respective received RF analog signal may include encoding an in-phase (I) component of the respective received RF analog signal and a quadrature-phase (Q) component of the respective received RF analog signal, and outputting a PN-encoded I analog signal and a PN-encoded Q analog signal.

In any of the preceding aspects/embodiments, the method may include, at the PN complex code source, filtering out undesired harmonics of the mutually orthogonal PN codes.

In any of the preceding aspects/embodiments, the method may include receiving instructions to set at least one of: a parameter for generating the mutually orthogonal PN codes; or a frequency for modulating the mutually orthogonal PN codes.

BRIEF DESCRIPTION OF THE DRAWINGS

For a more complete understanding of the present invention, and the advantages thereof, reference is now made to the following description taken in conjunction with the accompanying drawings, in which.

Similar reference numerals may have been used in different figures to denote similar components.

DETAILED DESCRIPTION OF ILLUSTRATIVE EMBODIMENTS

In a radio frequency (RF) communication network, it may be desirable to provide a communication device that has a receiver with capacity to support multiple access over different frequency bands. Example methods and apparatuses are described below, which may help to improve performance in receivers supporting multiple access, with relatively low hardware requirements.

Figure 1:
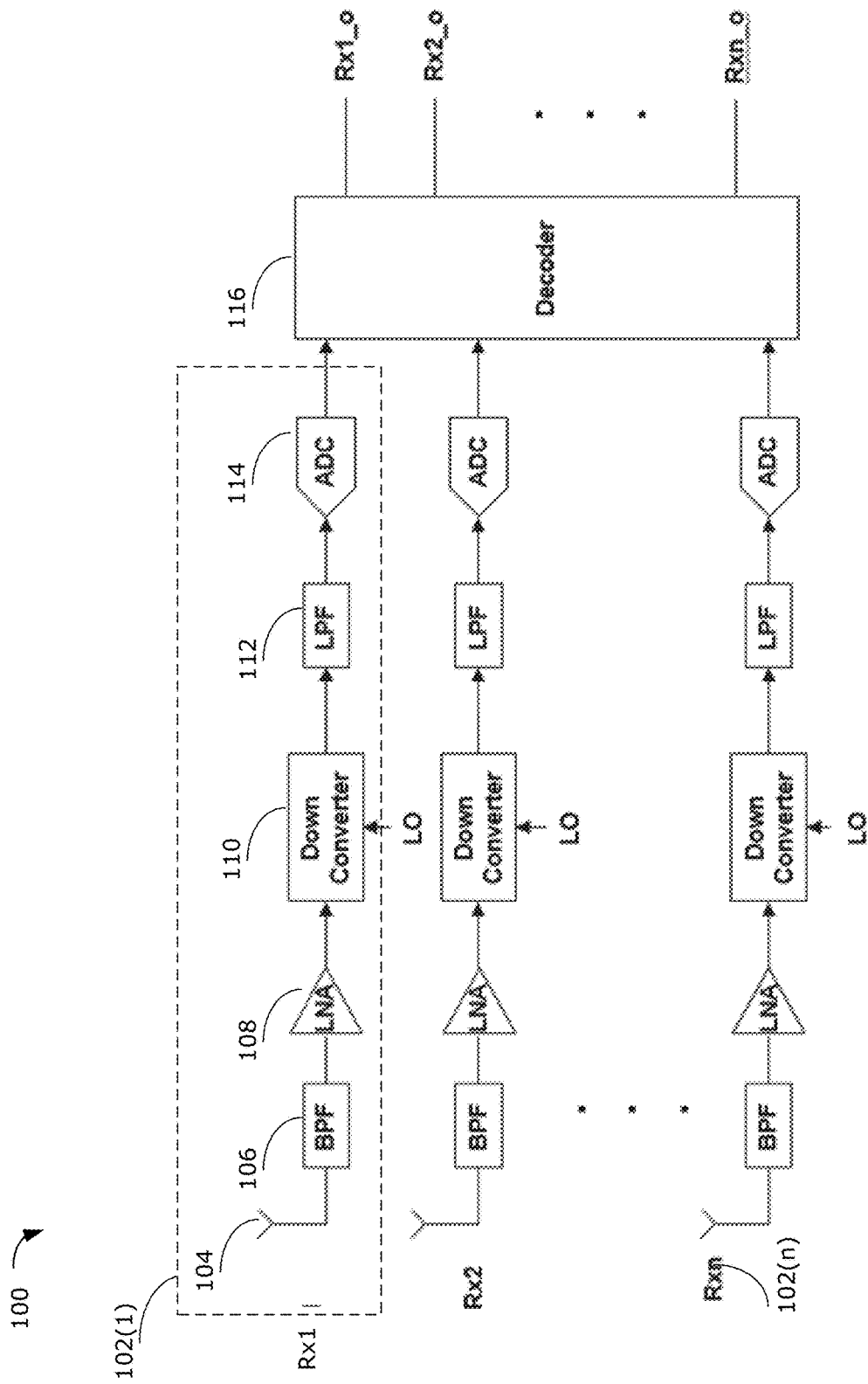
FIGS. 1-3 are a schematic diagrams of example conventional receivers.

To assist in appreciating the disclosed methods and systems, examples of conventional receivers are first discussed. A conventional receiver 100 is shown in FIG. 1. The receiver 100, as well as other receivers discussed below, may be implemented in any communication device, including devices for wired or wireless communications, such as an electronic device such as a base station or a user equipment (UE) for use in a wireless communication network, for example a Fifth Generation (5G) wireless communication network. Although examples may be described below in the context of wireless communications (e.g., using antennas to receive RF analog signals), it should be understood that the present disclosure may also be implemented for wired communications.

The receiver 100 includes a plurality of RF receiving (Rx) paths 102(1) to 102($n$) (generically referred to as Rx path 102). For clarity, one Rx path 102(1) is indicated by a dashed box. Each Rx path 102 includes at least one antenna 104, a band pass filter (BPF) 106, a low noise amplifier 108 (LNA), a down converter 110, a low pass filter (LPF) 112, and an analog to digital converter (ADC) 114. One Rx path 102 will be discussed in detail as an example. A RF analog signal is received by the antenna 104. In some examples, an antenna array may be used instead of a single antenna. The received signal is filtered by the BPF 106. The filtered signal is then provided to the LNA 108 where the signal is amplified to an amplitude suitable for subsequent processing. The amplified signal from the LNA 108 is provided to the down converter 110 to be down-converted to an intermediate frequency (IF) (or baseband frequency) using a local oscillator (LO) signal. The IF signal is then passed through the LPF 112. The output of the LPF 112 is provided to the ADC 114. The ADC 114 converts the filtered IF signal into a digital signal. Digital signals from each of the plurality of Rx paths 102 (in this example, the n digital signals from the n Rx paths Rx1 to Rxn) are then provided to a decoder 116 to generate decoded digital signals Rx1_o to Rxn_o. The decoded digital signals may then be supplied to other components of the receiver 100, such as a digital signal processor (DSP).

Although the receiver 100 is capable of processing multiple spectrum bands with different frequencies, the conventional architecture of the receiver 100 does not share hardware resources among the Rx paths 102. As well, single or multi-stage down converters 110 are included in each Rx path 102. This means that increasing the number of RF Rx paths would incur high hardware cost, increase overall circuitry complexity, require greater computation power and take up more printed circuit board (PCB) area in the communication device.

Figure 2:
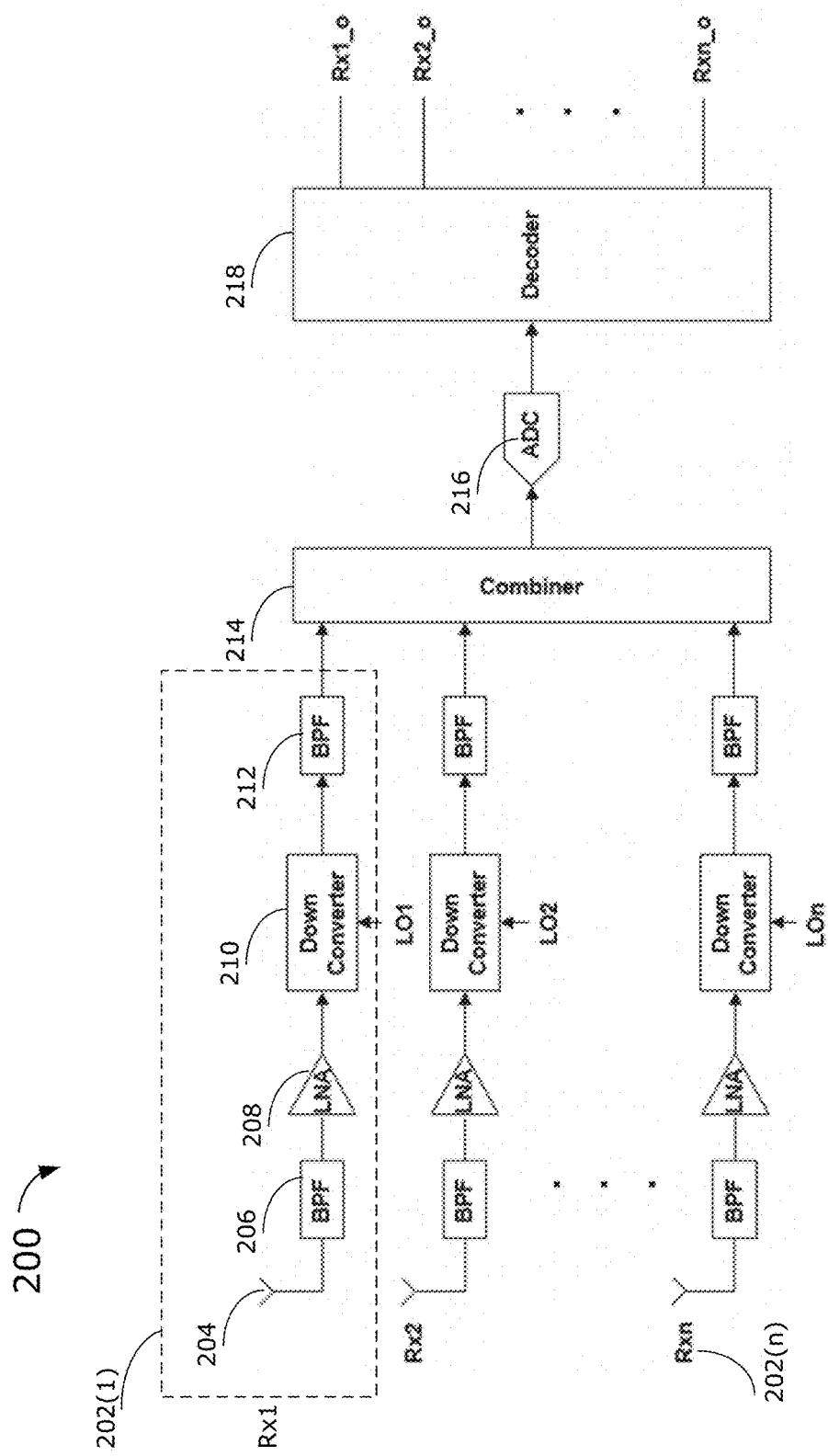

Another example conventional receiver 200 is shown in FIG. 2. In this example receiver 200, hardware costs may be reduced compared to the example receiver 100 of FIG. 1, because the receiver 200 uses a single ADC, rather than separate ADCs for each Rx path. The receiver 200 includes a plurality of RF Rx paths 202(1) to 202(n) (generically referred to as Rx path 202). For clarity, one Rx path 202(1) is indicated by a dashed box. Each Rx path 202 includes at least one antenna 204, a BPF 206, a LNA 208, a down converter 210, and a BPF 212. A RF analog signal is received by the antenna 204 and is processed by the BPF 206 and the LNA 208, similarly to that described above with respect to FIG. 1. The output of the LNA 208 is provided to the down converter 210.

Unlike the example receiver 100 of FIG. 1, in the example receiver 200 of FIG. 2, each down converter 210 performs down conversion using a different respective LO signal, indicated as LO1 to LOn. The down conversion serves to perform frequency translation, which maps the input RF signals to different respective IF frequencies, according to the frequencies of the respective LO signals. The IF analog signal outputted from the down converter 210 is passed through the BPF 212. The filtered analog signals from the Rx paths 202 can then be orthogonally combined by a combiner 214 into a single analog signal, without mixing up the signals. Therefore, a single ADC 216 can be used to convert the combined RF analog signal into a combined digital signal. The combined digital signal is then decoded by a decoder 218 to output n digital outputs Rx1_o to Rxn_o (corresponding to n Rx paths 202), which may be provided to other components of the communication device.

In the example shown in FIG. 2, because a single ADC 216 is shared by the plurality of Rx paths, the hardware cost may be reduced compared to the example shown in FIG. 1. However, the example system 200 of FIG. 2 still requires a down converter 210 in each Rx path 202.

Figure 3:
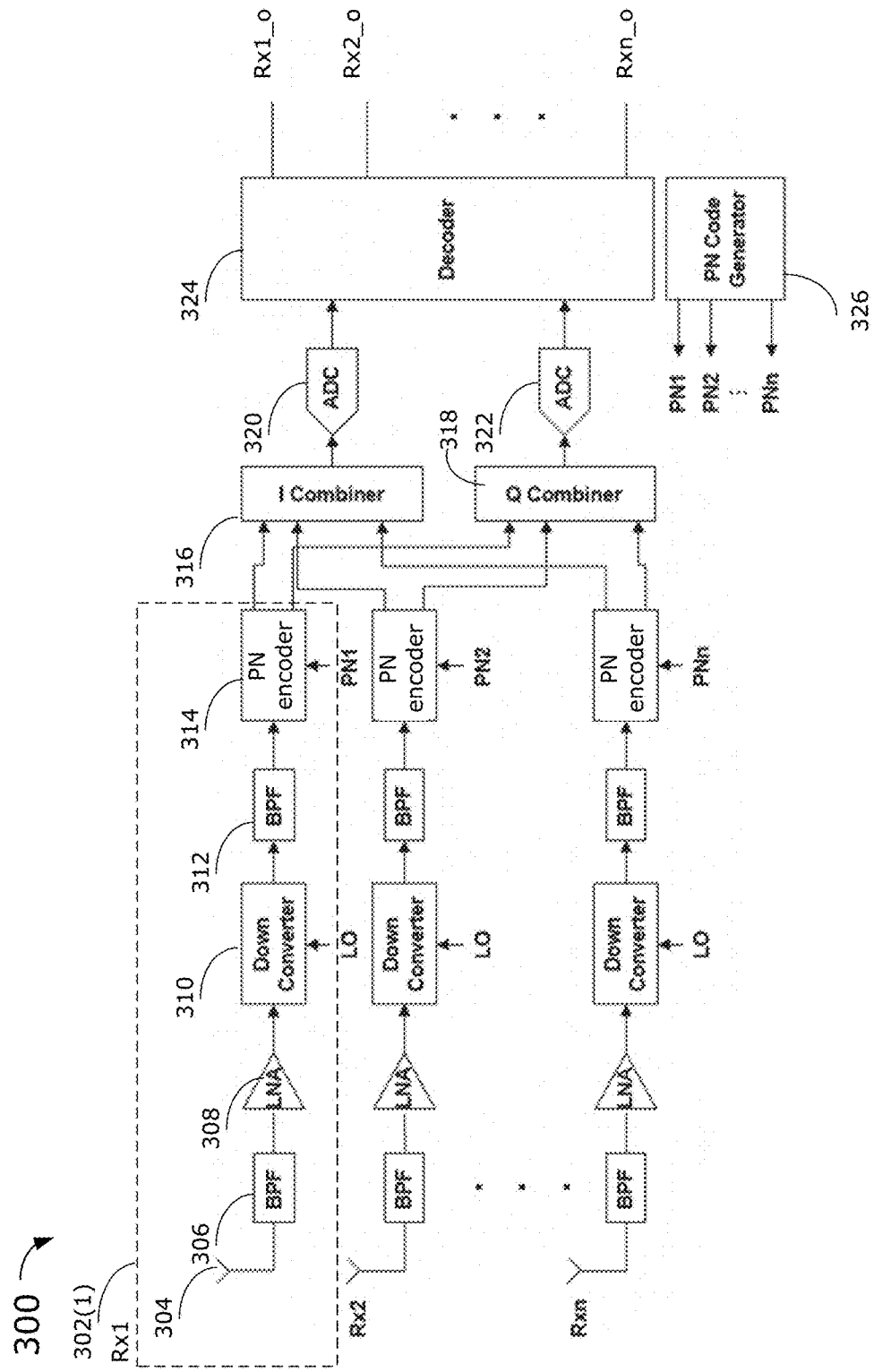

FIG. 3 illustrates a conventional receiver 300 that uses orthogonal spreading codes, such as pseudo-noise (PN) codes, to reduce hardware costs. The receiver 300 includes a plurality of RF Rx paths 302(1) to 302(n) (generically referred to as Rx path 302). For clarity, one Rx path 302(1) is indicated by a dashed box. Each Rx path 302 includes at least one antenna 304, a BPF 306, a LNA 308, a down converter 310, and a BPF 312. These components receive and process a RF analog signal similarly to the counterparts described above with respect to FIG. 1. In the receiver 300, each Rx path 302 further includes a PN encoder 314 coupled to the BPF 312. The PN encoder 314 encodes the filtered IF analog signal outputted from the BPF 312, using a PN code, over in-phase (I) and quadrature-phase (Q) branches, resulting in a PN-encoded I signal (which may also be referred to as the I component of a PN-encoded signal) and a PN-encoded Q signal (which may also be referred to as the Q component of the PN-encoded signal). A different respective PN code is used by the PN encoder 314 in each Rx path 302. The mutually orthogonal PN codes PN1 to PNn are generated by a PN code generator 326.

The PN-encoded I signals from the plurality of RF Rx paths 302(1) to 302(n) are combined by a I combiner 316 into an I combined analog signal, and the PN-encoded Q signals are combined by a Q combiner 318 into a Q combined analog signal. An ADC 320 then converts the I combined analog signal to an I combined digital signal, and an ADC 322 converts the Q combined analog signal to a Q combined digital signal. A decoder 324 decodes the I and Q combined digital signals to n digital outputs Rx1_o to Rxn_o (corresponding to the n Rx paths 302), and the decoded digital outputs may be provided to other components of the communication device.

In the receiver 300, the mutual orthogonality of the PN codes enables PN-encoded signals from a plurality of RF Rx paths to be combined and later recovered. However, using PN codes to modulate RF analog signals in the Rx paths may introduce undesired harmonics and images. The term "images" refers to frequency products that are unintentionally produced when a signal is modulated up or down in frequency, due to the nonlinear nature of a mixer. The introduction of undesired harmonics and images, which negatively impact device performance, means that additional processing of the signals is required to avoid distortion.

A receiver, as disclosed herein, may help to improve device performance over multiple spectrum bands and reduce system hardware cost, and may address at least some drawbacks of the above-discussed conventional receivers. The disclosed receiver may be used in various applications, including in communication devices capable of multiple access in wireless communication networks. Although described in the context of a receiver, aspects of the present disclosure may also be implemented as an apparatus that provides PN complex codes and performs PN encoding, as discussed further below.

Figure 4A:
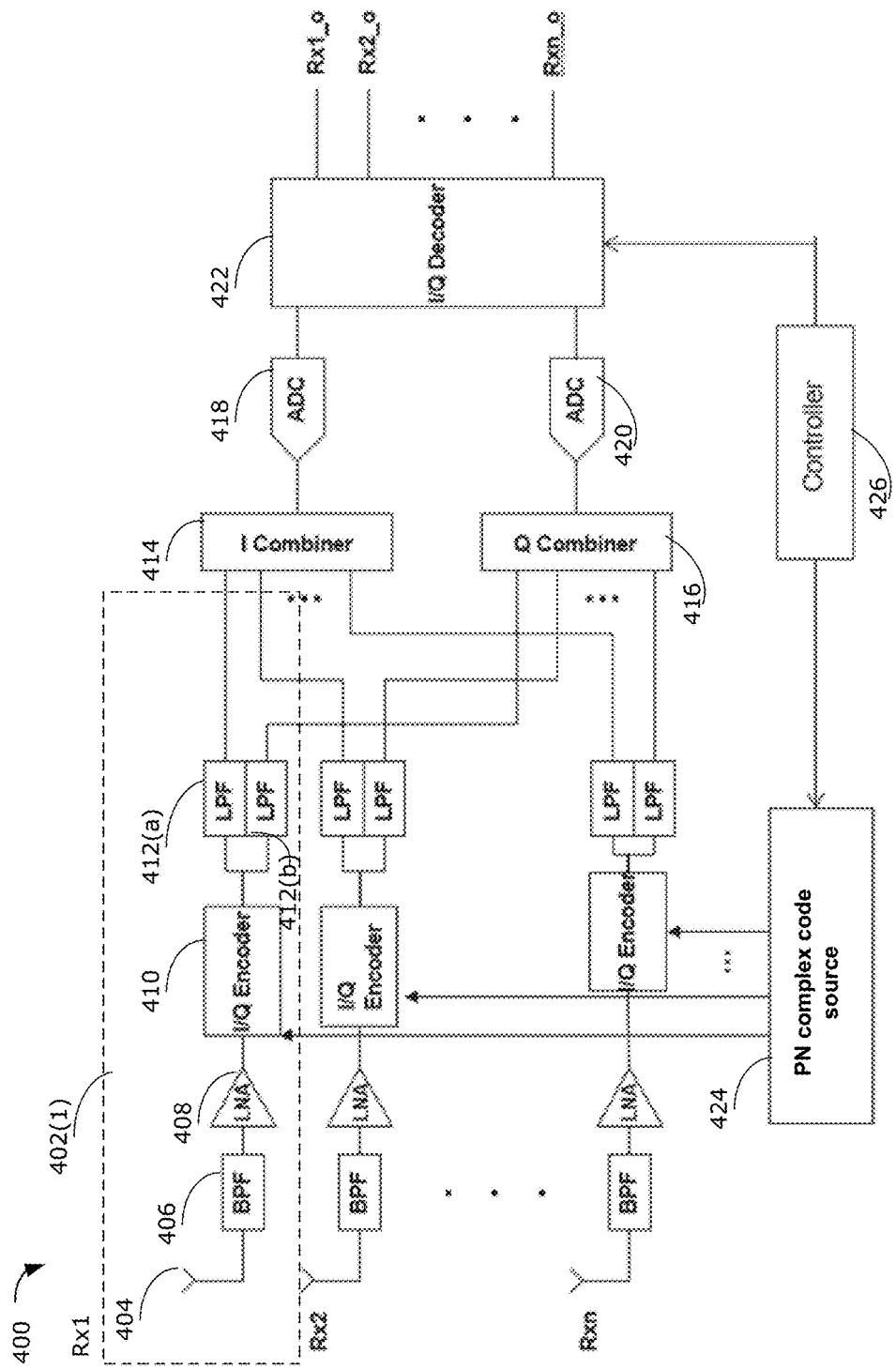
FIG. 4A is a schematic diagram of a disclosed receiver for wireless communication according to an example embodiment.

FIG. 4A shows an example disclosed receiver 400. The receiver 400 uses PN complex codes to perform spreading and down conversion in a single stage in each Rx path, in accordance with an example embodiment. The receiver 400 may help to improve overall device performance and reduce overall device cost, compared to conventional receivers that use down converters in the Rx paths. As presented in FIG. 4A, the receiver 400 includes a plurality of Rx paths 402(1) to 402(n) (generally referred to as Rx paths 402) on which RF analog signals are received and processed. For clarity, one Rx path 402(1) is indicated by a dashed box. Although described in the context of wireless communications, it should be understood that the receiver 400 may be used (with appropriate modifications where necessary) for wired communications. For example the Rx paths 402 may receive RF analog signals from a wired source rather than a wireless source. For simplicity, the receiver 400 will be described below in the context of wireless communications.

In one Rx path 402, an antenna 404 (or antenna array) receives an RF analog signal. The RF analog signal received by the antenna 404 is filtered by a BPF 406. The filtered signal from the BPF 406 is provided to a LNA 408 to amplify the low power signal to a desired amplitude. Then a PN encoder 410 encodes the amplified signal using a PN complex code and outputs a PN-encoded analog signal. The PN encoder uses the PN complex code to perform analog signal spreading and down-conversion, in a single step. A different PN complex code is used for PN encoding in each respective Rx path 402. The PN complex codes are mutually orthogonal. Each PN complex code may have been filtered (e.g., using a filter as discussed further below) to remove or reduce undesired harmonics. The PN complex codes are centered at a code modulation frequency by complex modulation, such that fold-in images are not generated during the complex modulation. Details about generation of the filtered PN complex code will be discussed further below.

In the example of FIG. 4A, the PN encoder 410 is an I and Q encoder (also referred to as an I/Q encoder), which performs PN encoding using a PN complex code over I and Q branches. In other examples, the PN encoder 410 may be a real encoder that outputs an encoded signal having only a real component. The I/Q encoder 410 outputs a PN-encoded I analog signal (also referred to as the I component of a PN-encoded analog signal) and a PN-encoded Q analog signal (also referred to as the Q component of a PN-encoded analog signal). When distinct information signals are separately processed over I and Q branches, this effectively doubles the number of channels operating within the receiver. The PN-encoded I signal and the PN-encoded Q signal are filtered by LPFs 412(*a*) and 412(*b*), respectively. The output from each Rx path 402 is a filtered PN-encoded I analog signal and a filtered PN-encoded Q analog signal.

An I combiner 414 combines the filtered PN-encoded I analog signals from the plurality of Rx paths into a I combined analog signal, and a Q combiner 416 combines the filtered PN-encoded Q analog signals from the plurality of Rx paths into a Q combined analog signal. An ADC 418 converts the I combined analog signal and outputs an I combined digital signal, and an ADC 420 converts the Q combined analog signal and outputs a Q combined digital signal. An I and Q decoder 422 (also referred to as an I/Q decoder) decodes the I combined digital signal and Q combined digital signal to a plurality of decoded digital outputs. The plurality of decoded digital outputs may be provided to other components of the communication device, such as a digital processor (not shown).

In the example of FIG. 4A, the I/Q encoder 410 outputs PN-encoded I and Q analog signals, which may be separately processed by separate I and Q combiners 414, 416 and ADCs 418, 420. In other examples, the encoder 410 may be a real encoder. In such examples, a single combiner may be used instead of separate I and Q combiners 414, 416. One LPF may be used instead of separate LPFs 412(*a*), 412(*b*), and a single ADC may be used instead of two ADCs 418, 420 to output one combined digital signal. Moreover, the decoder 422 may decode the combined digital signal over the real channel. Encoding and processing a complex signal may provide advantages compared to encoding and processing a real signal, as discussed further below.

In the example shown in FIG. 4A, the receiver 400 includes a PN complex code source 424 to provide the PN complex codes, and a controller 426 for controlling the operation of the PN complex code source 424 and the decoder 422. The PN complex code source 424 and the controller 426 are described in more detail further below. In some examples, the receiver 400 may not include the PN complex code source 424 and/or may not include the controller 426. For example, the PN complex codes may be generated by an external component and provided to the receiver 400. In some examples, external control signals may be used to control the operation of the decoder 422, or control signals may not be needed.

In the disclosed receiver 400, using mutually orthogonal PN complex codes to encode received analog signals enables combining of signals from a plurality of RF Rx paths, thus allowing for sharing of hardware components among the Rx paths. The disclosed receiver 400 avoids the use of multi-stage down converters. As well, using PN complex codes, rather than conventional PN codes, helps to reduce or eliminate undesired harmonics and images in the encoded signals, as will be discussed further below.

Figure 4B:
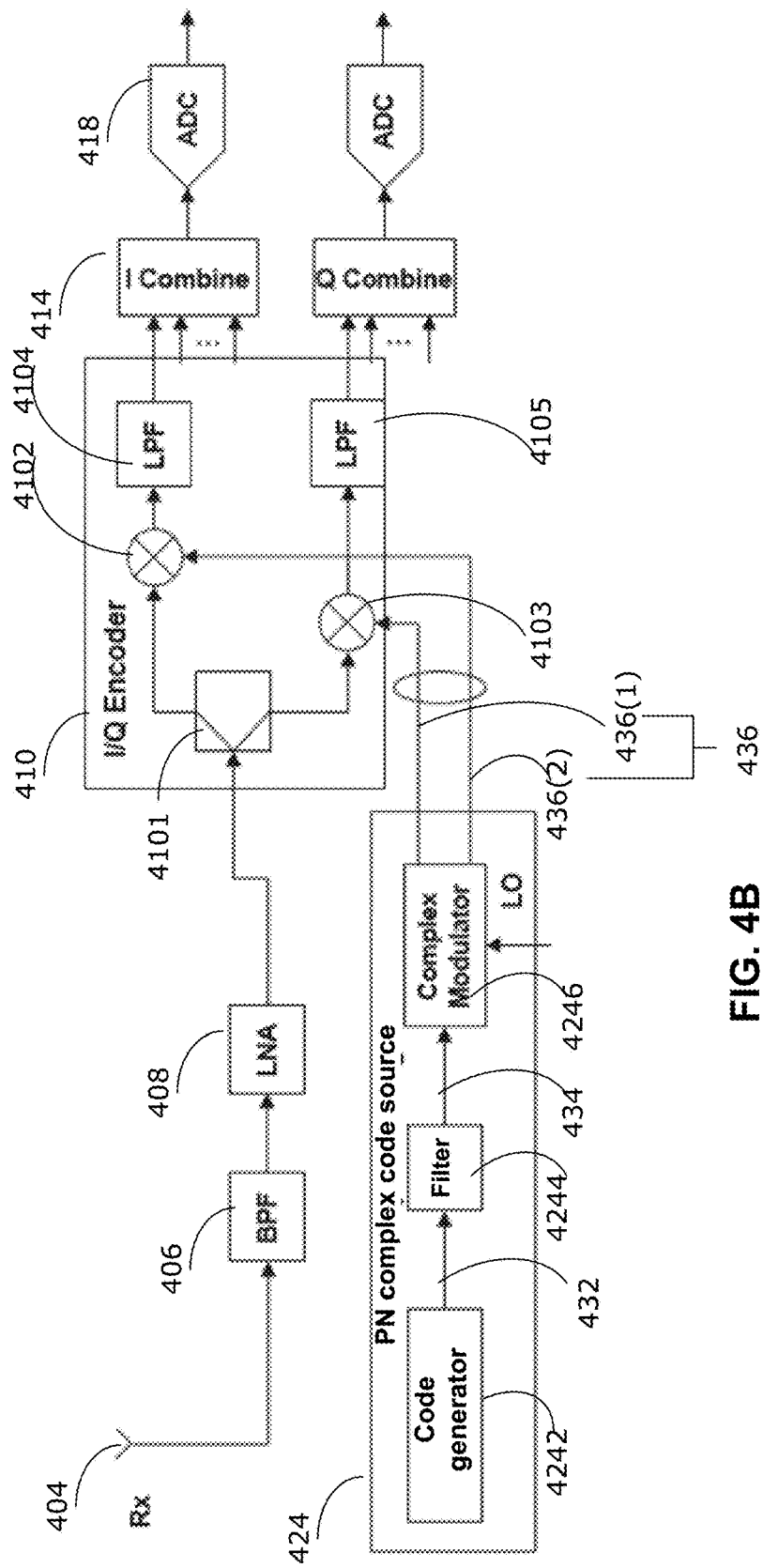
FIG. 4B is a schematic diagram of one RF Rx path of the receiver of FIG. 4A.

The process of generating the mutually orthogonal PN complex codes and performing encoding using a respective PN complex code on each Rx path is now discussed in greater detail with reference to FIG. 4B. For simplicity, the LPFs 412(*a*), 412(*b*) downstream of the PN encoder 410 are not shown in FIG. 4B. As mentioned above, the receiver 400 may include the PN complex code source 424 to provide a respective PN complex code for use by the PN encoder 410 on each respective Rx path 402. The number of PN complex codes provided by the PN complex code source 424 corresponds to the number of Rx paths 402 being used. The PN complex code source 424, in this example, includes a code generator 4242, a filter 4244, and a complex modulator 4246. The code generator 4242 generates a plurality of mutually orthogonal codes 432. The number of codes 432 generated corresponds to the number of Rx paths 402 being used. The generated codes 432 are unfiltered and unmodulated PN codes. In some example embodiments, the plurality of codes 432 may be generated by the code generator 4242 in parallel. In some example embodiments, one or more parameters (such as code type, code length, and/or code rate) for generating the mutually orthogonal codes are variable and may be controlled by a control signal (e.g., a control signal from the controller 426 or an external control signal). The parameter(s) for generating the mutually orthogonal codes may be selected to achieve desired performance characteristics, as discussed further below.

The mutually orthogonal codes 432 are provided to the filter 4244 to filter out undesired harmonics of the PN codes. The filter 4244 may be a low-pass filter or other type of filter (e.g., a band-pass filter) tuned to remove or reduce undesired harmonics. Removal or reduction of undesired harmonics may help to reduce interference and distortion when the PN complex code is used for encoding received analog signals at the PN encoder 410. Outputs of the filter 4244 may be referred to as filtered PN codes 434. The filtered PN codes 434 are then provided to the complex modulator 4246 for complex modulation. The complex modulator 4246 modulates each filtered PN code 434 to a code modulation frequency using an LO signal. The complex modulation enables each filtered PN code 434 to be centered at the code modulation frequency. The outputs of the complex modulator 4246 are the PN complex codes 436 that are provided to the PN encoders 410. In some examples, the filter 4244 may be omitted. For example, the mutually orthogonal codes 432 generated by the code generator 4242 may already be sufficiently free of undesired harmonics.

Figure 4C:
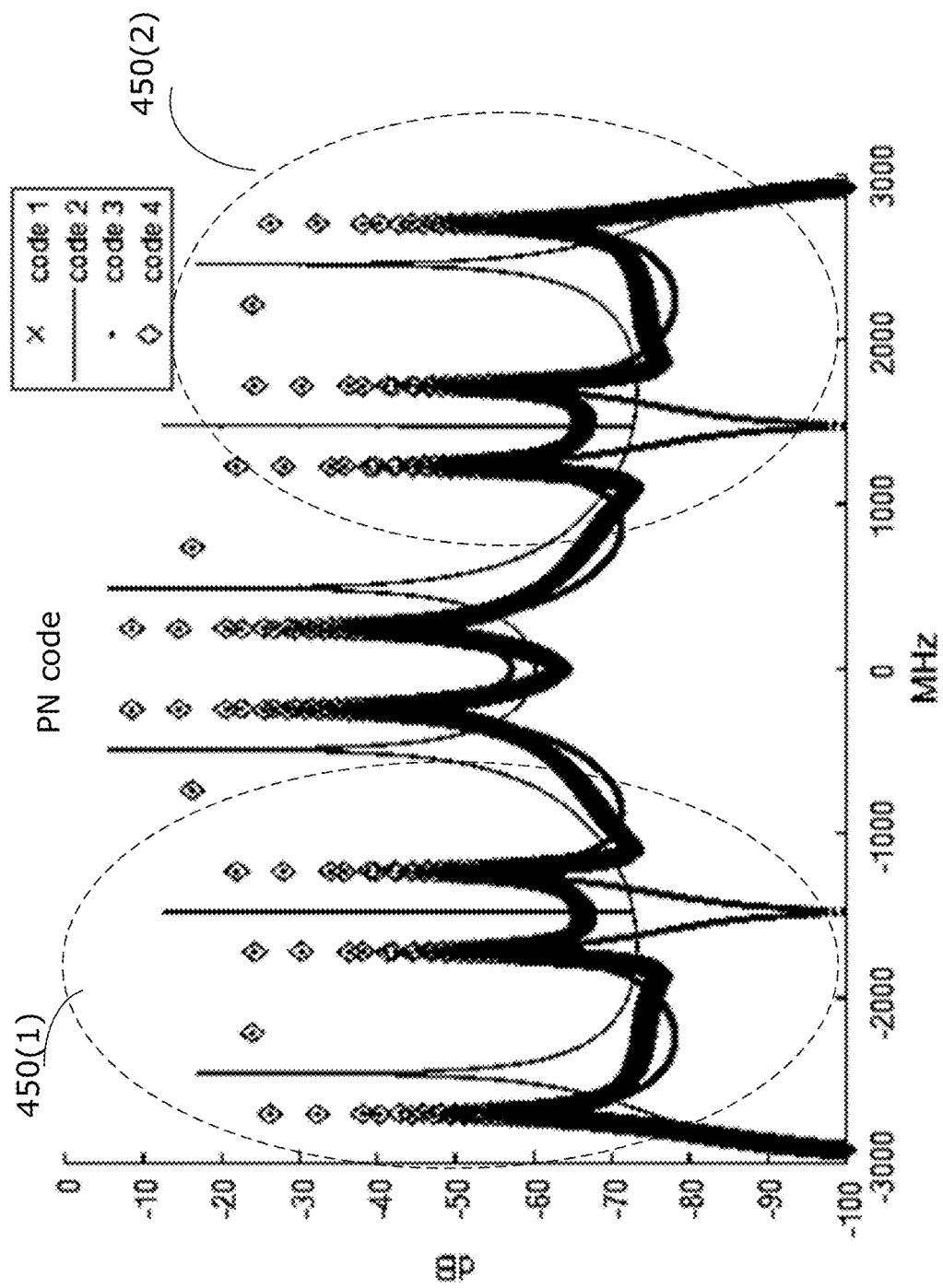
FIG. 4C shows plots of various example mutually orthogonal codes generated by the PN code generator shown in FIG. 4B.
Figure 4D:
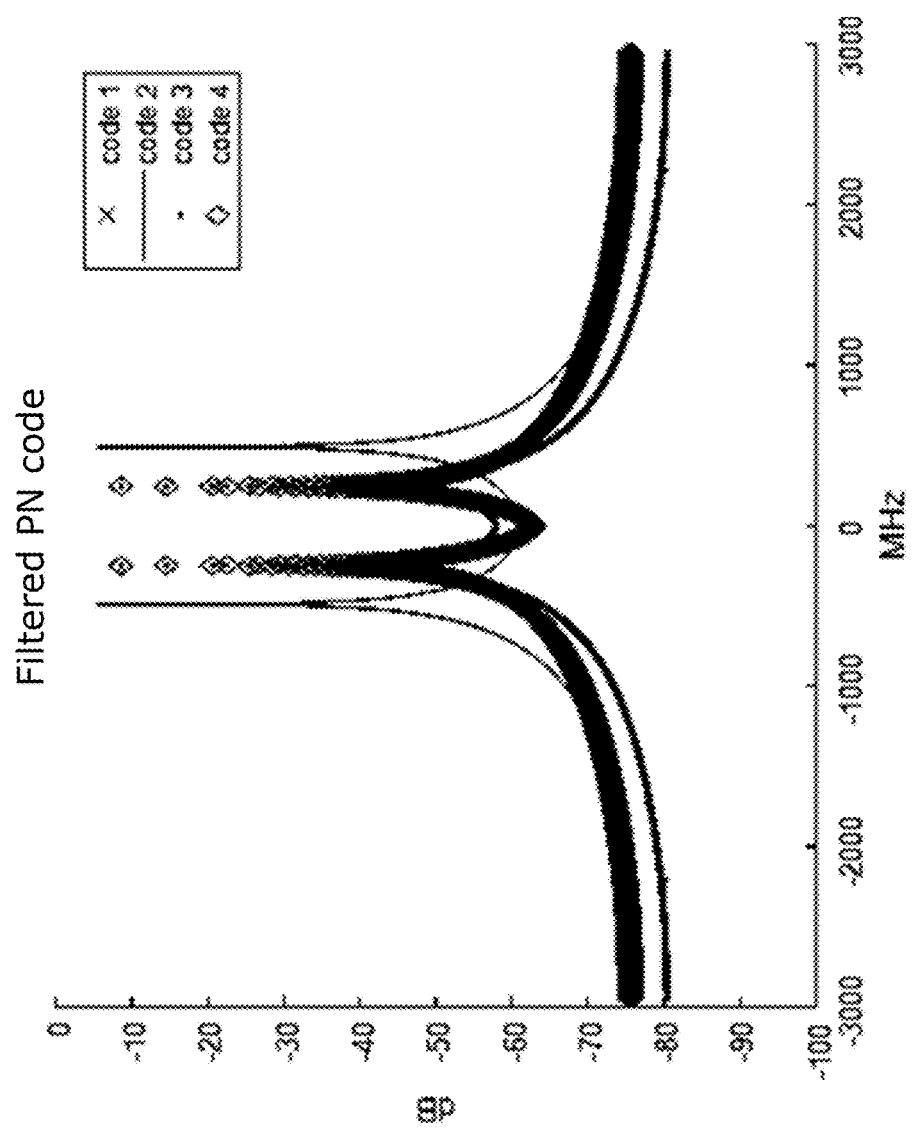
FIG. 4D shows plots of example mutually orthogonal codes after being filtered by the low-pass filter shown in FIG. 4B.
Figure 4E:
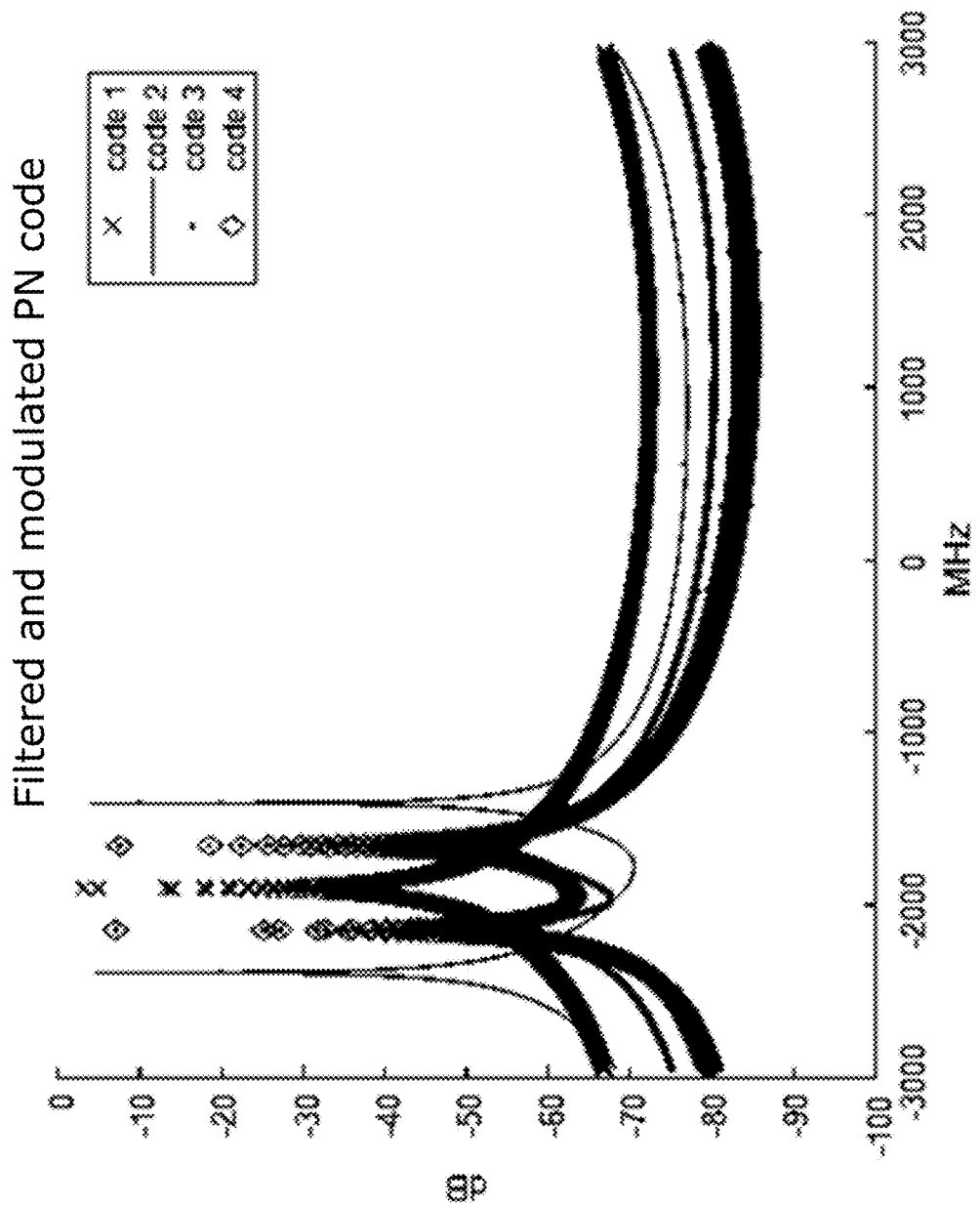
FIG. 4E shows plots of example mutually orthogonal codes after being modulated by the complex modulator shown in FIG. 4B.

FIGS. 4C to 4E illustrate examples of the outputs of each stage of the PN complex code source 424 described above. FIG. 4C shows four example unfiltered and unmodulated PN codes (code 1 to code 4) that may be generated by the code generator 4242. As shown in FIG. 4C, each unfiltered and unmodulated PN code in this example includes undesired harmonics 450(1) and 450(2), which are indicated by dashed ellipses (generically referred to as undesired harmonics 450). Each PN code is filtered by the filter 4244 (e.g., a low-pass filter) to filter out the undesired harmonics 450 and output a respective filtered PN code 434. FIG. 4D shows the four example filtered PN codes, with undesired harmonics filtered out by the filter 4244. The complex modulator 4246 then modulates the center frequency of each filtered PN code to a code modulation frequency. FIG. 4E shows the four filtered and modulated PN codes, with center frequencies modulated from 0 MHz to around −2000 MHz by the complex modulator 4246.

In some example embodiments, the complex modulator 4246 may be implemented using a multiplier, which multiplies each filtered PN code with the LO signal over the time domain, to modulate the filtered PN code to the desired code modulation frequency.

Modulating each filtered PN code using complex modulation may help to avoid or reduce the production of undesired fold-in images. The complex modulation of the PN codes results in negligible or no fold-in images, whereas real modulation can result in significant fold-in images. By reducing or eliminating the production of fold-in images, complex modulation of the filtered PN codes may help to reduce inter-modulation components when the filtered and modulated PN codes are used for encoding each received signal, and this may help to improve device performance.

Reference is made to FIG. 4B again. As discussed above, the receiver 400 may use an I/Q encoder 410 to encode the RF analog signal. Generally, complex encoding of the RF analog signal may help to improve overall device performance compared to real encoding, due to the avoidance of fold-in images as discussed above. In the example shown in FIG. 4B, the I/Q encoder 410 includes a splitter 4101, first and second multipliers 4102, 4103, and first and second LPFs 4104, 4105. The splitter 4101 splits the RF analog signal from the LNA 408 to an I analog signal and a Q analog signal.

The I analog signal is encoded by an I component 436(2) of the PN complex code using the first multiplier 4102. The first LPF 4104 may then filter the PN-encoded I analog signal. Similarly, the Q analog signal is encoded by a Q component 436(1) of the PN complex code using the second multiplier 4103, and subsequently may be filtered by the second LPF 4105.

Reference is made to FIG. 4A again. As discussed previously, in some example embodiments, a controller 426 may be included within the receiver 400. The controller 426 may provide instructions to control operation of the Rx paths 402 and/or the PN complex code source 424, for example to support multiple spectrum access and/or different signal bandwidths. In some example embodiments, the PN complex code source 424 may receive instructions to set one or more parameters, such as code type, code length, and/or code rate, for generation of mutually orthogonal codes. In some example embodiments, a signal bandwidth (such as 20 MHz, 40 MHz, etc.) supported by the receiver 400 for transmission may be variable by varying the code rate. In some example embodiments, the PN complex code source 424 may receive instructions to set the code modulation frequency to which the filtered PN code is modulated.

In some example embodiments, the number of Rx paths 402 that are used by the receiver 400 may be selected from a total number of available Rx paths at the receiver 400, and may be variable. For example, all available Rx paths 402 may be used, such that RF analog signals are received and processed by all available Rx paths 402. In other examples, only a subset of all available Rx paths 402 may be selected for use, and unselected Rx paths do not receive or process RF analog signals. Any Rx path may be set to be used or not used, at any time, by control signals (e.g., control signals from the controller 426, or external control signals). The ability to control the number of Rx paths 402 that are used by the receiver 400 may help to more efficiently use the resources of the communication device.

In some examples, a controller external to the receiver 400 (e.g., another controller or processor within the communication device) may provide instructions to the receiver 400 instead of, or in addition to, the controller 426 that is internal to the receiver 400.

Figure 5A:
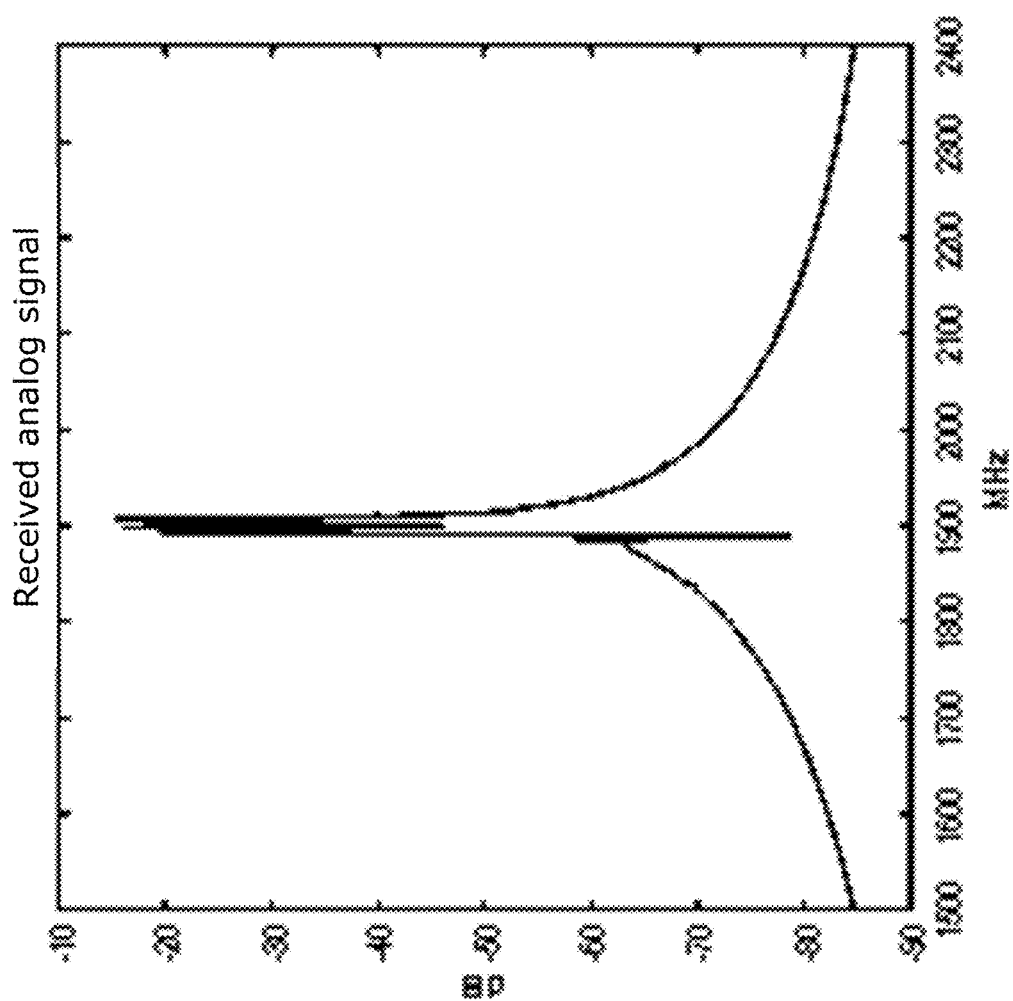
FIG. 5A is a plot of an example RF analog signal received on one RF Rx path according to an example embodiment.
Figure 5B:
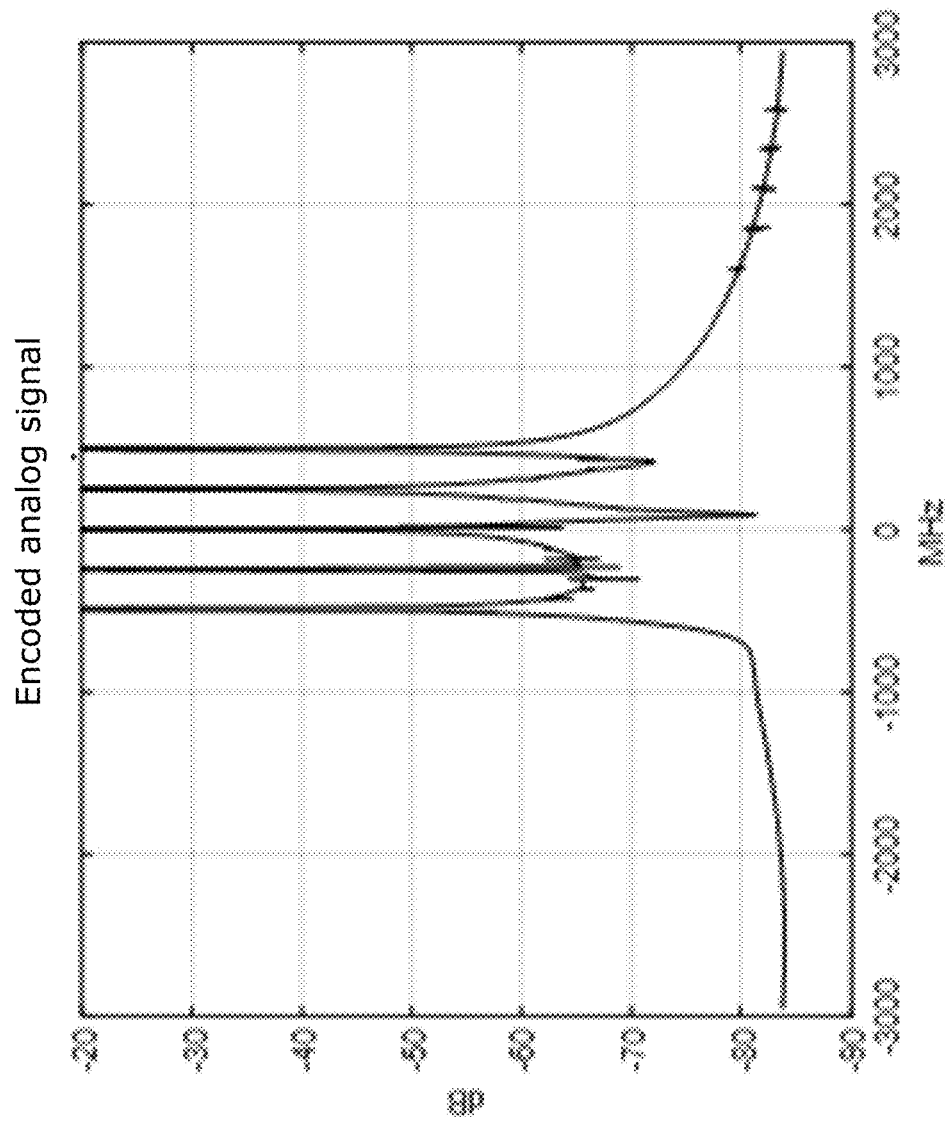
FIG. 5B is a plot of an example encoded output from a PN encoder on one Rx path according to an example embodiment.
Figure 5C:
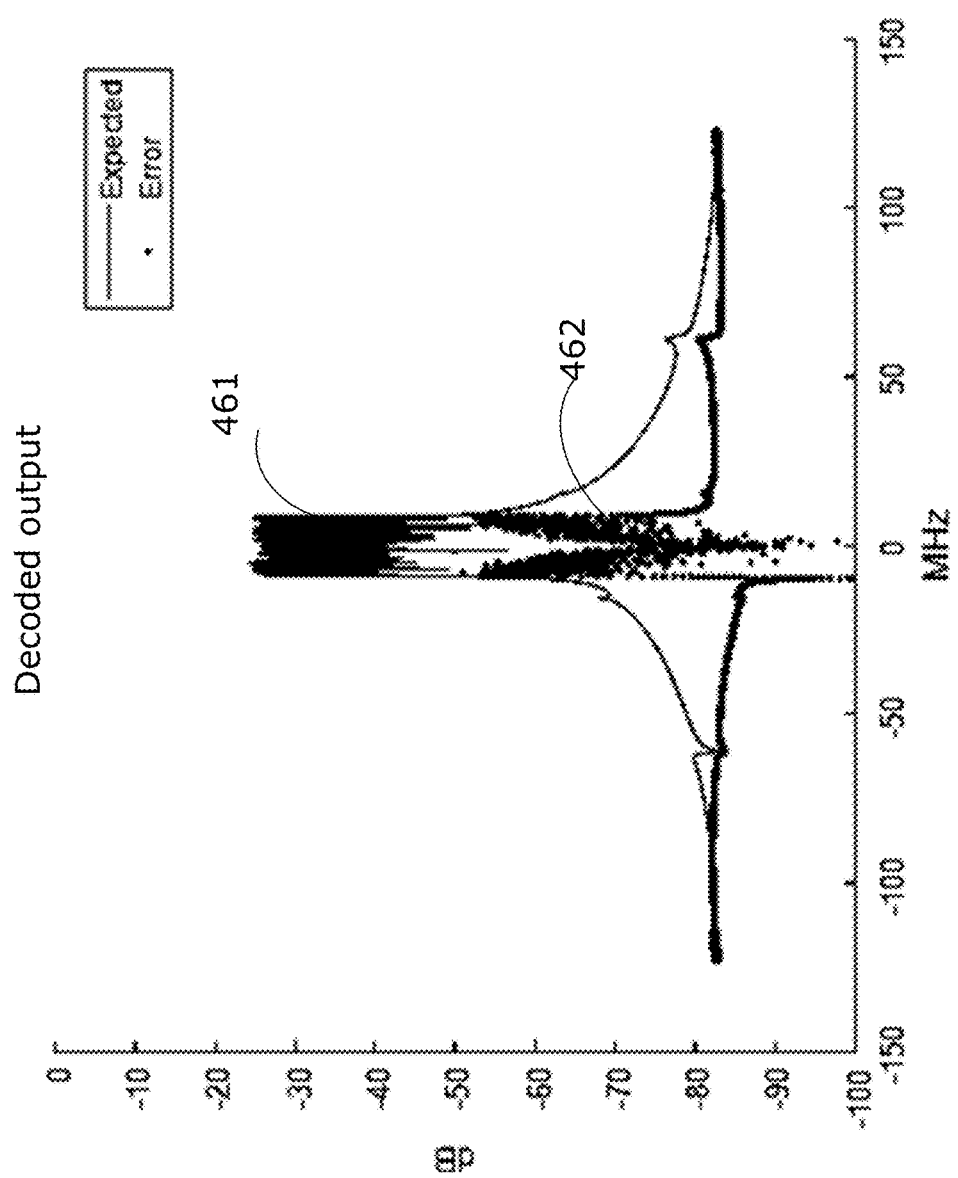
FIG. 5C shows plots of an example decoded digital output and error according to an example embodiment.

FIGS. 5A to 5C are simulation plots showing how an RF analog signal is processed and converted to a digital signal using a PN complex code, in the example receiver 400. In these simulations, four RF Rx paths are used, the PN code length is four, the signal bandwidth is 20 MHz, and a carrier frequency is 1.9 GHz. The RF analog signals are received by the four RF Rx paths within the receiver 400. FIG. 5A shows an analog signal received on one Rx path 402. FIG. 5B shows the combined PN-encoded analog signal after the analog signal of FIG. 5A has been encoded by the I/Q encoder 410 using a PN complex code and combined. It should be noted that the I and Q components of the combined PN-encoded signal are not plotted separately in FIG. 5B. FIG. 5C shows the decoded digital signal 461 that is expected (i.e., the ideal theoretical output) after decoding the encoded signal of FIG. 5B. FIG. 5C also shows an error 462 between the expected decoded digital output and the actual decoded digital output from the decoder 422. FIG. 5C shows that, in this example, the error is negligible. This means that the disclosed receiver 400 provides decoded digital output that is sufficiently close to the expected decoded digital output.

In the disclosed example receiver 400, by encoding the RF analog signal with PN complex codes, analog spreading and down conversion may be performed in a single stage at the PN encoder, rather than using multiple down converters and filters as in a conventional receiver. This simplification may help to reduce hardware cost and/or improve device performance, and may avoid significant interference and distortion of the signals. Degradation in device performance caused by phase noise and jitter may be reduced significantly by using PN complex codes for PN encoding. Using PN complex codes enables the plurality of RF Rx paths to share hardware resources, and may also reduce or eliminate undesired harmonics, thus improving device performance. Furthermore, production of undesired fold-in images is avoided by using complex modulation for generating the PN complex codes.

It will be appreciated that one or more components discussed above on each RF Rx path 402 may be made of basic electronic components. For example, the BPF 406 and/or any of the filters 412(a), 412(b), 4104, and 4244 may be resistor-inductor-capacitor (RLC) circuits. The LNA 408, the modulator 4101, the I/Q encoder 410, the I combiner 414, the Q combiner 416, the ADCs 418, 420, PN code generator 4242, and/or the complex modulator 4246 may be implemented using any suitable transistors or integrated circuits.

It should be understood that aspects of the present disclosure may be implemented as an apparatus that includes the PN encoder 410 and PN complex code source 424 as described above. The apparatus may be in general any receiver including the PN encoder 410 and PN complex code source 424 as described above, and may have other components different from those described above with reference to FIG. 4A. For example, components on the Rx path 402, such as the BPF 406, LNA 408 and/or LPFs 412(a), 416(b) may be varied or omitted.

Figure 6:
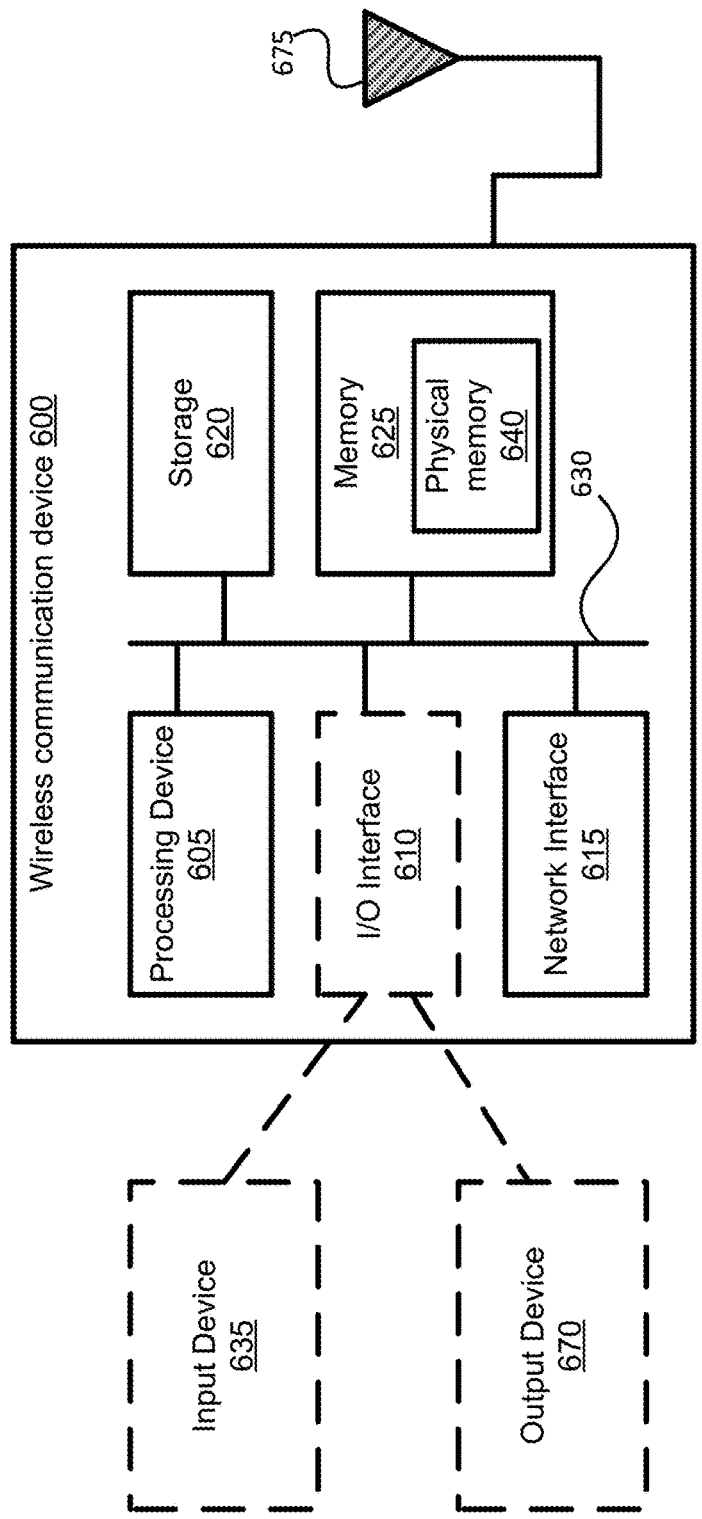
FIG. 6 is a schematic representation of an example wireless communication device which may include the example receiver of FIG. 4A.

FIG. 6 is a schematic diagram of an example wireless communication device 600, which may be used to implement the methods and systems disclosed herein. For example, the wireless communication device 600 may be an electronic device, such as a user equipment (UE) or a base station used in 5G communication networks, and may include a receiver 400 as disclosed above. Other communication devices (including communication devices for wired or wireless communications) suitable for implementing examples described in the present disclosure may be used, which may include components different from those discussed below. Although FIG. 6 shows a single instance of each component, there may be multiple instances of each component in the wireless communication device 600 and the wireless communication device 600 could be implemented using parallel and/or distributed architecture.

The wireless communication device 600 may include one or more processing devices 605, such as a processor, a microprocessor, an application-specific integrated circuit (ASIC), a field-programmable gate array (FPGA), a dedicated logic circuitry, or combinations thereof. The wireless communication device 600 may also include one or more optional input/output (I/O) interfaces 610, which may enable interfacing with one or more optional input devices 635 and/or output devices 670. The wireless communication device 600 may include one or more network interfaces 615 for wired or wireless communication with a network (e.g., an intranet, the Internet, a P2P network, a WAN and/or a LAN, and/or a Radio Access Network (RAN)) or other node. The network interface(s) 615 may include one or more interfaces to wired networks and wireless networks. Wired networks may make use of wired links (e.g., Ethernet cable). Wireless networks, where they are used, may make use of wireless connections transmitted over an antenna such as antenna 675. The network interface(s) 615 may provide wireless communication via one or more transmitters or transmit antennas and one or more receivers or receive antennas, for example. In this example, one antenna 675 is shown, which may serve for both transmitter and receiver. However, in other examples there may be multiple antennas for transmitting and receiving. In some examples, an antenna array may be used. The wireless communication device 600 may also include one or more storage units 620, which may include a mass storage unit such as a solid state drive, a hard disk drive, a magnetic disk drive and/or an optical disk drive.

The wireless communication device 600 may include one or more memories 625 that can include physical memory 640, which may include a volatile or non-volatile memory (e.g., a flash memory, a random access memory (RAM), and/or a read-only memory (ROM)). The non-transitory memory(ies) 625 (as well as storage 620) may store instructions for execution by the processing device(s) 605, such as to carry out processing such as those described in the present disclosure. The memory(ies) 625 may include other software instructions, such as for implementing an operating system (OS), and other applications/functions. In some examples, one or more data sets and/or modules may be provided by an external memory (e.g., an external drive in wired or wireless communication with the wireless communication device 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 630 providing communication among components of the wireless communication device 600. The bus 630 may be any suitable bus architecture including, for example, a memory bus, a peripheral bus or a video bus. Optional input device(s) 635 (e.g., a keyboard, a mouse, a microphone, a touchscreen, and/or a keypad) and optional output device(s) 670 (e.g., a display, a speaker and/or a printer) are shown as external to the wireless communication device 600, and connected to optional I/O interface 610. In other examples, one or more of the input device(s) 635 and/or the output device(s) 670 may be included as a component of the wireless communication device 600.

The apparatus or receiver described above may be included as a component of the wireless communication device 600, for example as a component in the signal path for receiving RF analog signals using multiple antennas 675. The processing device(s) 605 may also be used to control processing the received RF analog signal and generation of PN complex codes. For example, one or more functions of the controller 426 described above may be performed by the processing device(s) 605.

Figure 7:
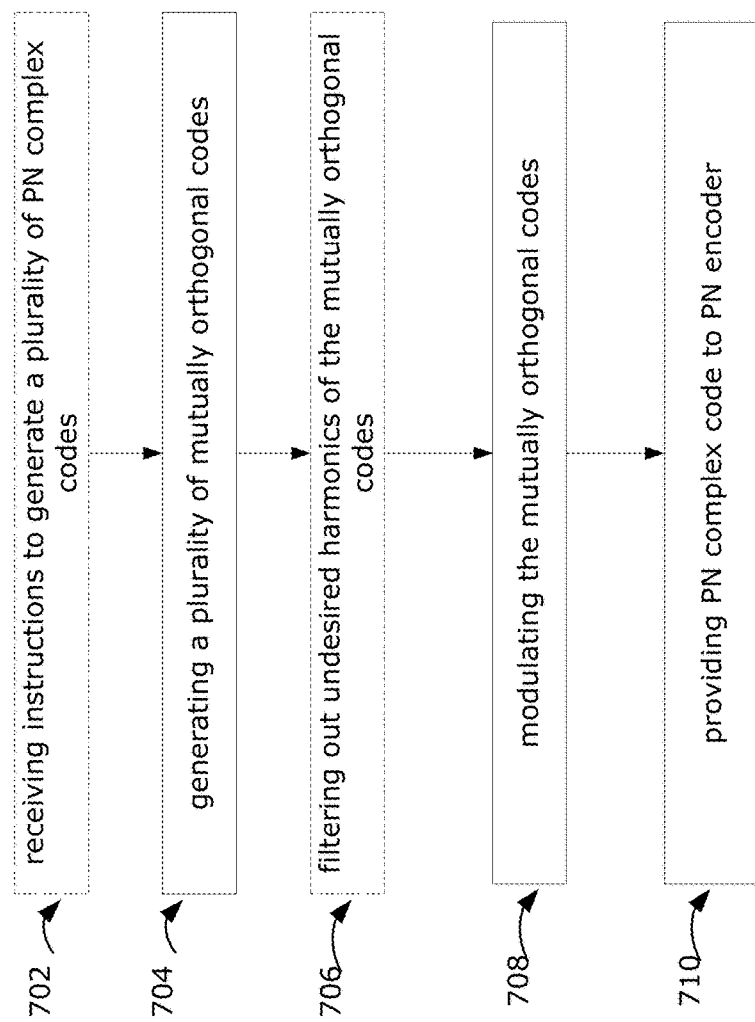
FIG. 7 is a flowchart of a method that may be carried out by a PN complex code source according to an example embodiment.

FIG. 7 illustrates an example method that may be implemented using the PN complex code source 424 described above to provide mutually orthogonal PN complex codes for PN encoding of received RF analog signals by the PN encoder 410.

The method includes, optionally, at 702, receiving instructions to generate a plurality of PN complex codes. The instructions may be received from a source internal to the receiver 400 (e.g., from the controller 426) and/or from a source external to the receiver 400 (e.g., from a processing device 605 of the wireless communication device 600). In some example embodiments, the instructions may control a variable parameter, such as code type, code length and/or code rate, for generating mutually orthogonal codes. In some examples, the instructions may control a variable code rate in order to achieve a signal bandwidth that the receiver is required to support. In some examples, the instructions may indicate the code modulation frequency for modulation of individual codes.

At 704, a plurality of mutually orthogonal codes is generated. The codes are generated in accordance with the received instructions, in examples where such instructions were received at 702. The plurality of mutually orthogonal codes may be generated by the above-described PN code generator 4242 of the PN complex code source 424.

At 706, optionally, undesired harmonics of the mutually orthogonal codes may be filtered out. In some examples, as illustrated above, undesired harmonics may be filtered out using a filter 4244 in the PN complex code source 424.

At 708, the mutually orthogonal codes are modulated to a code modulation frequency. In some example embodiments, the code modulation frequency to which each code is modulated may be variable in accordance with the instructions received at 702. The modulation may be performed by the complex modulator 4246 in the PN complex code source 424.

At 710, each PN complex code is provided to the PN encoder of each respective Rx path, to perform PN encoding of the received analog signals. The number of PN complex codes corresponds to the number of Rx paths being used to receive analog signals, as discussed above.

In the present disclosure, example apparatus and receiver are described. By encoding signals using PN complex codes in the analog domain, the examples disclosed herein may perform both down-conversion and analog spreading simultaneously, which may reduce system hardware costs compared to conventional receivers. Further, the disclosed apparatus and receiver provide flexibility in how the RF analog signal is processed, by enabling software control of variable parameters. The example disclosed apparatus and receiver may introduce little or no negative interference and distortion to the received signals because undesired harmonics and fold-in images are avoided.

In various examples, using the PN complex code for complex encoding of the received RF analog signals may also help to improve system performance compared to real encoding.

The example disclosed receiver may be used in electronic devices, such as UEs and base stations, for example in a 5G communication system, to boost system performance, particularly for operation on various spectrum bandwidth with massive system capacity. Furthermore, the disclosed apparatus and receiver may have little or no negative impact on efficiency and power consumption of the device by performing down conversion and spreading simultaneously at a single stage. The hardware cost of the example disclosed receiver may be lower, compared to a conventional receiver.

In some examples, the disclosed apparatus and receiver may support multiple spectrum band access for MIMO system without using band frequency selection or band filter bank. The receiver may be flexibly controlled to vary at least one parameter for generating a PN code. The receiver may also enable a plurality of RF Rx paths to share hardware resources flexibly. Moreover, the number of Rx analog paths, signal bandwidth, and code modulation frequency may be varied to enable the receiver to receive and process multiple spectrum bands over various frequencies. Thus, the flexibility of the receiver may be increased without significant increase to the complexity in the circuitry design. The disclosed apparatus and receiver may provide a greater degree of freedom to design for supporting massive wireless communication system for MIMO technology without significantly increasing hardware cost.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. An apparatus for encoding a plurality of received radio frequency (RF) analog signals, the apparatus comprising:
   a plurality of pseudo-noise (PN) encoders for performing analog signal spreading and down-conversion, each PN encoder being configured to encode a respective received RF analog signal using a respective one of a plurality of mutually orthogonal PN complex codes and to output a respective PN-encoded analog signal; and
   a PN complex code source configured to provide the respective mutually orthogonal PN complex codes to the plurality of PN encoders, the PN complex code source including a code generator for generating multiple mutually orthogonal PN codes, and a complex modulator for modulating the mutually orthogonal PN codes to generate the mutually orthogonal PN complex codes.

2. The apparatus of claim 1, wherein the PN-encoded analog signals from the plurality of PN encoders are combinable into a combined analog signal.

3. The apparatus of claim 1, wherein the PN-encoded analog signals are outputted to be decoded by a decoder.

4. The apparatus of claim 1, wherein each PN encoder is an in-phase and quadrature-phase (I/Q) PN encoder, wherein the I/Q PN encoder is configured to encode an in-phase (I) component of the respective received RF analog signal and a quadrature-phase (Q) component of the respective received RF analog signal, to output a PN-encoded I analog signal and a PN-encoded Q analog signal.

5. The apparatus of claim 1, wherein the PN complex code source further comprises:
   a filter configured to filter out undesired harmonics of the mutually orthogonal PN codes.

6. The apparatus of claim 5, wherein the filter is a low-pass filter.

7. The apparatus of claim 1, wherein at least one of:
   a parameter for generating the mutually orthogonal PN codes; or
   a frequency for modulating the mutually orthogonal PN codes is variable.

8. The apparatus of claim 7, wherein the PN complex code source is configured to receive instructions to set the at least one of:
   the parameter for generating the mutually orthogonal PN codes; or
   the frequency for modulating the mutually orthogonal PN codes.

9. A receiver comprising:
   a plurality of receiving paths, each receiving path configured to receive a respective radio frequency (RF) analog signal;
   a plurality of pseudo-noise (PN) encoders for performing analog signal spreading and down-conversion, each PN encoder being configured to encode a respective received RF analog signal on a respective receiving path using a respective one of a plurality of mutually orthogonal PN complex codes and to output a respective PN-encoded analog signal;
   a PN complex code source configured to provide the respective mutually orthogonal PN complex codes to the plurality of PN encoders, the PN complex code source including a code generator for generating multiple mutually orthogonal PN codes, and a complex modulator for modulating the mutually orthogonal PN codes to generate the mutually orthogonal PN complex codes;

at least one combiner configured to combine the respective PN-encoded analog signals and output a combined analog signal;

at least one analog to digital converter (ADC) configured to convert the combined analog signal to a combined digital signal; and a decoder configured to decode the combined digital signal and output decoded digital signals corresponding to the respective received RF analog signals.

10. The receiver of claim 9, wherein each PN encoder is an in-phase and quadrature-phase (I/Q) PN encoder, wherein the I/Q PN encoder is configured to encode an in-phase (I) component of the respective received RF analog signal and a quadrature-phase (Q) component of the respective received RF analog signal, to output a PN-encoded I analog signal and a PN-encoded Q analog signal;

wherein the at least one combiner comprises:
an I combiner for combining the PN-encoded I analog signals and output an I combined analog signal; and
a Q combiner for combining the PN-encoded Q analog signals and output a Q combined analog signal; and
wherein there are at least two ADCs, each ADC being configured to convert a respective one of the I combined analog signal and the Q combined analog signal and to output a respective one of an I combined digital signal and a Q combined digital signal.

11. The receiver of claim 9, wherein the PN complex code source further comprises:
a filter configured to filter out undesired harmonics of the mutually orthogonal PN codes.

12. The receiver of claim 11, wherein the filter is a low-pass filter.

13. The receiver of claim 9, wherein at least one of:
a parameter for generating the mutually orthogonal PN codes; or
a frequency for modulating the mutually orthogonal PN codes is variable.

14. The receiver of claim 13, wherein the PN complex code source is configured to receive instructions to set the at least one of:
the parameter for generating the mutually orthogonal PN codes; or
the frequency for modulating the mutually orthogonal PN codes.

15. The receiver of claim 9, wherein the plurality of receiving paths used for receiving the RF analog signals is selected from a total number of available receiving paths at the receiver.

16. The receiver of claim 15, wherein the receiver is further configured to receive instructions to select the plurality of receiving paths.

17. The receiver of claim 14, further comprising a controller configured to provide the instructions.

18. A method for encoding a plurality of received radio frequency (RF) analog signals, the method comprising:
at a pseudo-noise (PN) complex code source:
generating a plurality of mutually orthogonal PN codes;
performing complex modulation on the mutually orthogonal PN codes, to obtain a plurality of mutually orthogonal PN complex codes; and
providing the plurality of mutually orthogonal PN complex codes to a plurality of PN encoders; and
at each PN encoder, performing analog signal spreading and down-conversion by encoding a respective received RF analog signal using a respective one of the plurality of mutually orthogonal PN complex codes, and outputting a respective PN-encoded analog signal.

19. The method of claim 18, wherein each PN encoder is an in-phase and quadrature-phase (I/Q) PN encoder, wherein encoding the respective received RF analog signal comprises encoding an in-phase (I) component of the respective received RF analog signal and a quadrature-phase (Q) component of the respective received RF analog signal, and outputting a PN-encoded I analog signal and a PN-encoded Q analog signal.

20. The method of claim 18, further comprising, at the PN complex code source, filtering out undesired harmonics of the mutually orthogonal PN codes.

21. The method of claim 18, further comprising receiving instructions to set at least one of:
a parameter for generating the mutually orthogonal PN codes; or
a frequency for modulating the mutually orthogonal PN codes.

* * * * *